(12) United States Patent
Tamir et al.

(10) Patent No.: US 12,197,592 B2
(45) Date of Patent: Jan. 14, 2025

(54) ZERO-TRUST CLOUD DEVELOPMENT

(71) Applicant: Synamedia Limited, Staines Upon Thames (GB)

(72) Inventors: Assaf Yosef Tamir, Jerusalem (IL); Itai Ephraim Zilbershtein, Hod Hasharon (IL); Steven Jason Epstein, Hashmonaim (IL); Michal Irit Devir, Haifa (IL)

(73) Assignee: SYNAMEDIA LIMITED, Maidenhead (GB)

( * ) Notice: Subject to any disclaimer, the term of this patent is extended or adjusted under 35 U.S.C. 154(b) by 317 days.

(21) Appl. No.: 17/944,178

(22) Filed: Sep. 13, 2022

(65) Prior Publication Data
US 2024/0086550 A1 Mar. 14, 2024

(51) Int. Cl.
*G06F 21/60* (2013.01)
*G06F 9/455* (2018.01)

(52) U.S. Cl.
CPC ........ *G06F 21/602* (2013.01); *G06F 9/45558* (2013.01); *G06F 2009/4557* (2013.01); *G06F 2009/45587* (2013.01)

(58) Field of Classification Search
CPC .... G06F 21/602; G06F 21/62; G06F 21/6209; G06F 21/6227; G06F 8/60; G06F 9/45558; G06F 2009/4557; G06F 2009/45587; G06F 2009/45562; H04L 9/0822; H04L 9/0869; H04L 9/0891; H04L 9/0894; H04L 9/40; H04L 9/0863; H04L 63/06; H04L 63/0428; H04L 63/0838; H04L 63/10; H04L 67/08; H04L 2209/88; H04L 2463/081
See application file for complete search history.

(56) References Cited

U.S. PATENT DOCUMENTS

| 8,103,883 | B2* | 1/2012 | Smith ................. G06F 21/6218 380/278 |
| 9,300,640 | B2* | 3/2016 | Pate ..................... G06F 9/45558 |
| 10,181,037 | B2* | 1/2019 | Novak ................... G06F 21/575 |
| 11,604,901 | B2* | 3/2023 | Sion ....................... H04L 9/3265 |
| 11,727,115 | B2* | 8/2023 | Finchelstein ......... G06F 21/602 713/2 |
| 2014/0059541 | A1* | 2/2014 | Heninger ............ G06F 9/45545 718/1 |
| 2017/0171197 | A1* | 6/2017 | Alexander .............. H04L 63/08 |
| 2019/0222574 | A1* | 7/2019 | Akbar ................... H04L 63/061 |
| 2020/0285746 | A1* | 9/2020 | Buendgen ............... G06F 21/44 |
| 2021/0334377 | A1* | 10/2021 | Drori ....................... G06F 21/44 |
| 2022/0393869 | A1* | 12/2022 | Baldwin ............... H04L 9/0825 |

OTHER PUBLICATIONS

Extended European Search Report dated Jan. 25, 2024, European Application No. 23194736.7, pp. 1-7.

* cited by examiner

*Primary Examiner* — Han Yang
(74) *Attorney, Agent, or Firm* — Fernando & Partners, LLP

(57) ABSTRACT

Techniques for zero-trust cloud deployment are described herein. In accordance with various embodiments, a device including a processor and a non-transitory memory derives a key from deployment metadata of a virtual machine, where the deployment metadata change with each deployment of the virtual machine. The device then encrypts secrets using the key to bind the key to the virtual machine. The device further deploys the virtual machine in a cloud using the deployment metadata, including loading the encrypted secrets to the deployed virtual machine in the cloud.

20 Claims, 12 Drawing Sheets

700

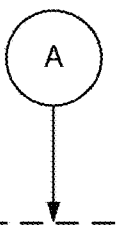

┌──────────────────────────────────────────────────────────────────────┐
│ The secrets are uploaded from a local repository as locally encrypted secrets │──750
│ to a repository for deployment to the cloud; and the method further includes │
│ generating the locally encrypted secrets using a local key stored on-premise │
└──────────────────────────────────────────────────────────────────────┘

┌──────────────────────────────────────────────────────────────────────┐
│ Obtain the locally encrypted secrets from the repository for deployment to the │──752
│ cloud; and decrypt the locally encrypted secrets using the local key to derive │
│                              the secrets                             │
└──────────────────────────────────────────────────────────────────────┘

┌──────────────────────────────────────────────────────────────────────┐
│ Calculate the key from the deployment metadata after booting the virtual │──760
│ machine in the cloud; and decrypt the encrypted secrets to generate  │
│ unencrypted secrets without storing the unencrypted secrets in non-transitory │
│                          memory of the cloud                          │
└──────────────────────────────────────────────────────────────────────┘

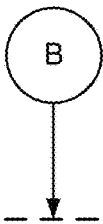

┌──────────────────────────────────────────────────────────────────────┐
│      The encrypted secrets include encrypted data, and the method further │──770
│ includes: (a) obtaining data corresponding to the encrypted data, wherein the │
│ data are encrypted using an on-premise key; and (b) restoring the encrypted │
│ data on the virtual machine in the cloud by decrypting the data using the on- │
│            premise key and re-encrypting the data using the key      │
└──────────────────────────────────────────────────────────────────────┘

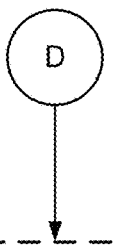

---
The encrypted secrets include an encrypted credential, and the method further ~780
includes: (a) obtaining an updated encrypted credential corresponding to the
encrypted credential using a one-time password; and (b) replacing the
encrypted credential on the virtual machine in the cloud by loading the
updated encrypted credential to the deployed virtual machine in the cloud,
decrypting the updated encrypted credential using the one-time password, and
re-encrypting the updated encrypted credential using the key
---

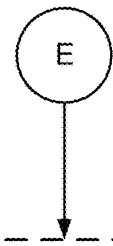

---
The encrypted secrets include an encrypted executable package ~790
corresponding to an application, and the method further includes: (a) obtaining
the application via cryptographic messaging; (b) deriving an updated key from
updated deployment metadata of the virtual machine; (c) encrypting an
executable package corresponding to the application using the updated key to
generate an updated encrypted package and bind the updated key to the
virtual machine; and (d) re-deploying the virtual machine in the cloud using the
updated deployment metadata, including loading the updated encrypted
package to the re-deployed virtual machine in the cloud
---

Figure 7C

ZERO-TRUST CLOUD DEVELOPMENT

TECHNICAL FIELD

The present disclosure relates generally to security in cloud computing and, more specifically, to enabling zero-trust deployment in cloud computing.

BACKGROUND

Many business entities utilize virtual machines (VMs) and applications deployed in the cloud to provide services. Cloud deployments have certain advantages such as scalability, flexibility, cost-effectiveness, and the automation of setting up and running the VMs and applications. However, during cloud deployments, secrets that are critical for services may not be adequately protected, e.g., private information, keys, and/or codes, etc. In particular, during cloud deployment, when moving the secrets from on-premise storage (e.g., a local device located on the premise of an organization owning the secrets) to the cloud, several actors with various administrative privileges and capabilities have access to the secrets. Currently, even though such actors belong to different organizations and/or entities and may not share the same interest of safe guarding the secrets, they are trusted by many systems with access to the secrets. In the case of certain actors with administrative rights breaching the trusts and misusing privileges, the secrets, including the inner workings of confidential applications on virtual machines, may be exposed.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 7A-7C are flow diagrams illustrating a zero-trust cloud deployment method, in accordance with some embodiments.

Figure 1:
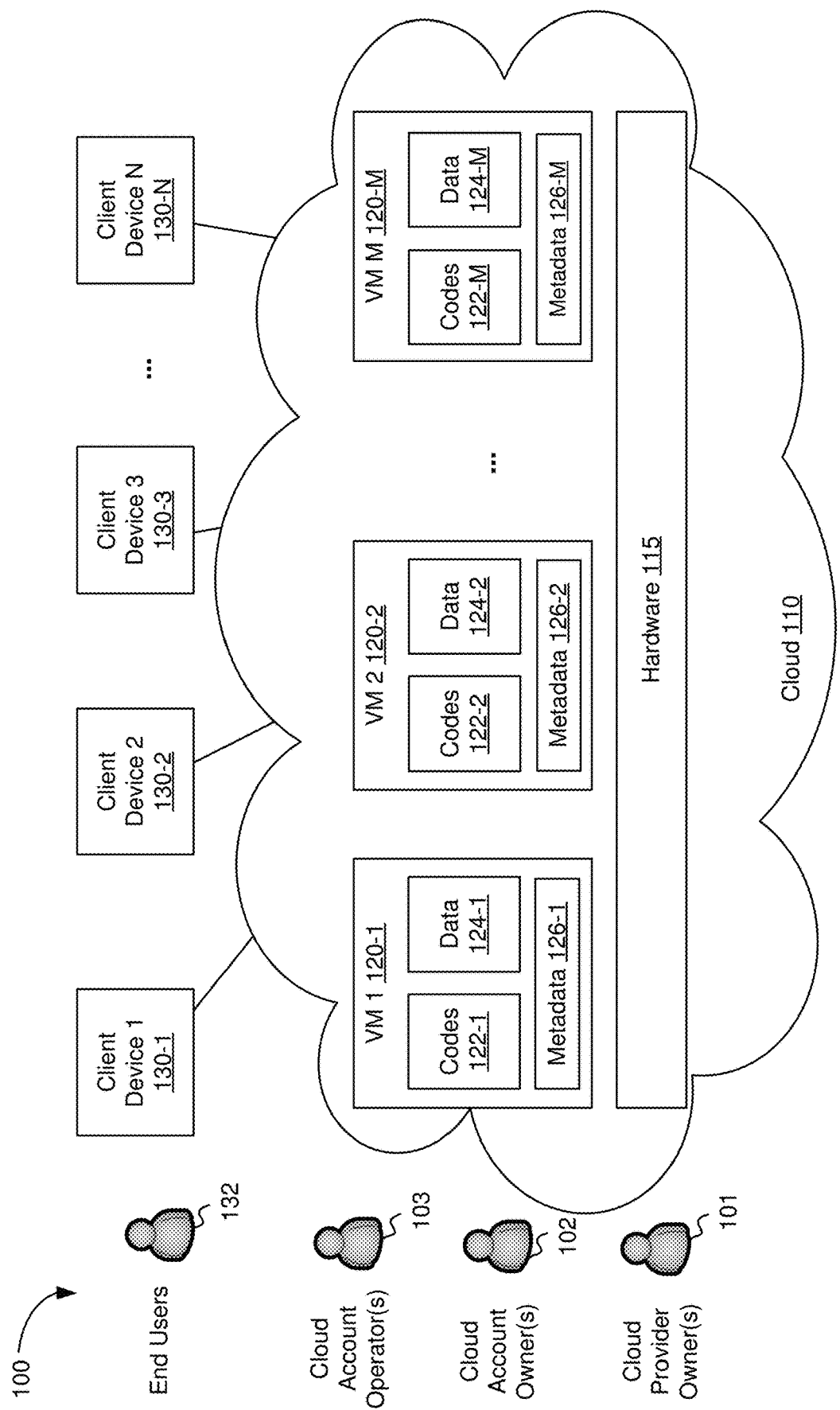
FIG. 1 is a block diagram of an exemplary cloud infrastructure, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Zero-trust cloud deployment methods, devices, and systems described herein address the aforementioned trust issues by creating a vault that protect secrets in the cloud. In some embodiments, the vault is created by locking down a virtual machine deployed in the cloud and encrypting secrets stored in the virtual machine. When deploying a virtual machine in the cloud environment, the cloud provider uploads physical files as well as metadata files describing the logical virtual machine (VM) metadata, e.g., instance identifier (ID), creation date, and/or modification date, etc. Such deployment metadata change with each and every deployment, e.g., each cloning and every request for a new mount of files. Accordingly, such metadata are both unique per physical file and immutable. Utilizing at least a portion of the deployment metadata, secrets are encrypted using a key derived from the deployment metadata. Accordingly, with the secrets being protected by the key, the secrets are accessible within the virtual machine but are inaccessible from outside the virtual machine, thus establishing zero-trust of any user from outside the virtual machine, even users with administrative privileges.

In accordance with various embodiments, a zero-trust cloud deployment method is performed at a device including a processor and a non-transitory memory. The method includes deriving a key from deployment metadata of a virtual machine, where the deployment metadata change with each deployment of the virtual machine. The method further includes encrypting secrets using the key to bind the key to the virtual machine. The method additionally includes deploying the virtual machine in a cloud using the deployment metadata, including loading the encrypted secrets to the deployed virtual machine in the cloud.

Example Embodiments

Techniques described herein deploy a zero-trust system that takes advantage of the aforementioned benefits of cloud deployment, but at the same time protects secrets and/or proprietary applications from users, including administrators. In some embodiments, a base for a vault, e.g., an encrypted image and/or package, is created outside the cloud during a continuous integration phase, e.g., on-premise and using a key known only to a vault owner, which is denoted as key_ci. Once the base is created, secrets, including proprietary applications, are protected against many users with administrative privileges, such as the cloud provider owner and the cloud account owner, etc.

To further protect against cloning attacks, the zero-trust system establishes the vault by disabling remote access and encrypting the secrets, including the deployed executable packages, using another key that is denoted as key_secret. In some embodiments, deployment metadata are used as seed(s) for generating key_secret. While some previously existing zero-trust solutions attempt to reduce application privileges or create a centralized key splitting scheme, the zero-trust system described herein distributes the protection to each virtual machine and the secrets do not exist outside each deployed virtual machine. Because existing files in the infrastructure are used for the protection of the secrets, including the deployed executable packages, the zero-trust system described herein has low integration cost and prevents malicious access by any user from outside the deployed virtual machine, i.e., zero-trust of any users, including users with administrative privileges.

Reference is now made to FIG. 1, which is a block diagram illustrating an exemplary system 100 with cloud infrastructure in accordance with some embodiments. In some embodiments, the exemplary system 100 includes a cloud 110 providing services to end users 132 at a plurality of client devices 130, e.g., client device 1 130-1, client device 2 130-2, client device 3 130-3, . . . , client device N 130-N. As described herein, the cloud 110 can be a public, private, or hybrid cloud and can include one or more cloud nodes. For example, the cloud 110 can be public clouds that are accessible over the Internet and made available as virtual machines (VMs) on a pay-per-use basis by third parties to customers. In another example, the cloud 110 can be a private cloud configured by an organization for employees or customers. In yet another example, the cloud 110 can be a hybrid cloud that includes a combination of public and private clouds to deploy and run applications.

In some embodiments, the cloud 110 includes hardware resources 115, e.g., a cluster of computers and/or a distributed network of computers, which further include components such as processor(s), memory, storage, network interfaces, etc. The cloud 110 facilitates access to resources and services. To provide the access to resources and services, each of VMs 120, e.g., VM 1 120-1, VM 2 120-2, . . . , VM M 120-M, is configured with a fraction of the underlying hardware resources 115 and the VMs 120 provide different computing, memory, storage, networking, and operating system (OS) options. As such, the VMs 120 provide remote access to the cloud computing infrastructure, and processing resources, storage, and/or network resources in the cloud 110 can be reserved, provisioned, accessed, and released.

In some embodiments, each VM 120 includes codes 122, e.g., for running the VM 120 and executing applications to provide services, data 124 used by the VM 120, and metadata 126 for deployment of the VM 120 and/or the applications. For example, VM 1 120-1 includes codes 122-1, data 124-1, and metadata 126-1; VM 2 120-2 includes codes 122-2, data 124-2, and metadata 126-2; and VM M 120-M includes codes 122-M, data 124-M, and metadata 126-M, etc. The codes 122 can be, for example, source codes, compiled codes, executable codes, etc. The data 124 can be, for example, private information such as health data, cryptographic keys for encryption and decryption of the data 124, credentials for authentication and/or authorization, information read and/or written by the codes 122 during execution, etc. In some embodiments, at least a portion of the metadata 126 describes the logical VM 120 running on top of the hardware 115 in the cloud 110, e.g., instance identifier (ID), creation time, modification time, etc. Accordingly, such metadata 125 are automatically modified on every clone and on any request for a new mount of the file. In other words, such metadata 126 are both unique with each VM and/or application deployment and immutable.

In some embodiments, applications are deployed as part of the cloud deployment, where the applications are deployed in the form of containers (also known as application containers). The terms "container" and "application container" as used herein, refer to an isolation unit or environment within an operating system and specific to a running program. When executed in their respective containers, one or more programs or scripts can run sandboxed on a VM using operating system virtualization to facilitate rebooting, provision of IP addresses, separate memory, processes etc. to the respective containers. In some embodiments, containers take the form of a package (e.g., an image), which include the application, application dependencies (e.g., services used by the application), the application's runtime environment (e.g., environment variables, privileges etc.), application libraries, other executables, and configuration files. As such, containers facilitate utilizing the underlying host hardware resources 115.

Many systems have secrets that are critical for the services provided by the virtual machines 120. In some embodiments, the secrets include the codes 122, e.g., application packages, executables, and/or source codes, and/or the data 124, e.g., health data, authentication and/or authorization information such as credentials or password, keys, etc. As described above, in the case of a breach, the recovery of the secrets can be difficult and/or costly. Therefore, many systems have securities in place to protect the secrets. In the area of cloud deployment, there are several actors with administrative privileges. For example, cloud provider owner(s) 101 own the hardware 115 and the cloud operating environment 110. In another example, cloud account owner(s) or administrators 102 are responsible for users' creation and access control. In yet another example, cloud account operator(s) 103 are responsible for operations and checking that the service offered within the respective account is running and available. Each of the actors 101, 102, and 103 has certain administrative privileges and rights and can potentially breach the implicit trust to reveal the secrets. As will be described in further detail below, a zero-trust system described herein eliminates the implicit trust and validates every state of the cloud deployment, thus protecting the secrets even from users with administrative privileges.

Figure 2:
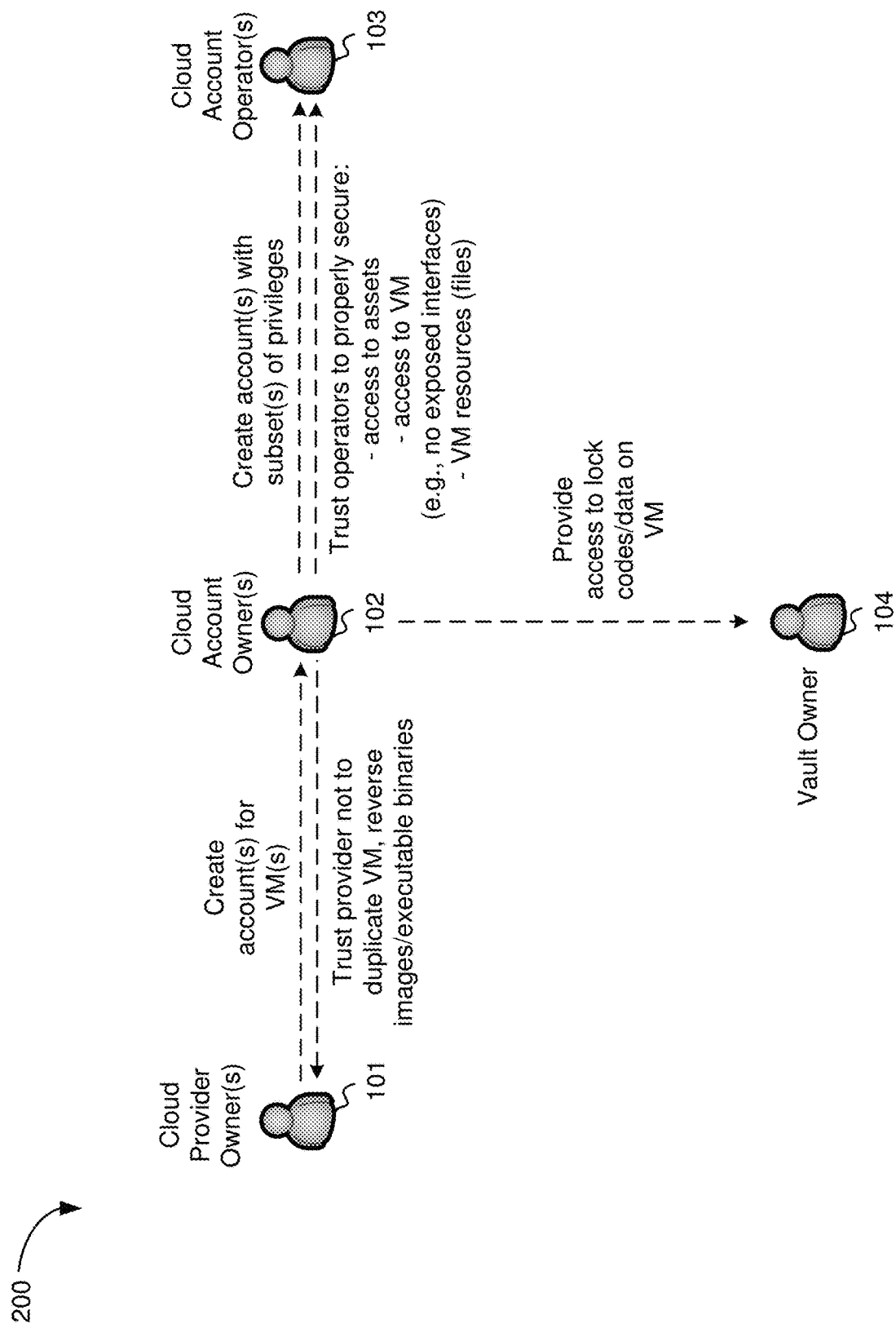
FIG. 2 is a diagram illustrating granting rights and implicit trust among various actors in zero-trust cloud deployment, in accordance with some embodiments.

FIG. 2 is a diagram 200 illustrating granting rights and implicit trust among various actors in zero-trust cloud deployment in accordance with various embodiments. The cloud provider owner(s) 101 own the physical and the cloud operating environment 110 shown in FIG. 1 and have the ultimate administrative rights for the system 100 shown in FIG. 1. Typically, the cloud provider owner(s) 101, e.g., as part of the system default policy, provide unlimited rights and privileges to the cloud account owner(s) 102 for a set of virtual machines (referred to hereinafter as the guest virtual machine(s) or guest VM(s)) hosted on the physical equipment and the cloud operating environment of the cloud provider owner(s) 101. Further, the cloud account owner(s) 102 can create account(s) to grant the cloud account operator(s) 103 a subset of their privileges. As will be described in further detail below with reference to FIG. 3, the privilege granting enables the cloud account owner(s) 102 and/or the cloud operator(s) 103 to run services on respective virtual machines. In particular, the privilege granting provides the cloud account owner(s) 102 and the cloud account operator(s) 103 the capabilities to modify the configuration of accounts and services, e.g., creating virtual machines, shutting down virtual machines, read, write, clone, etc.

As shown in FIG. 2, various actors in the system have implicit trust on other actors to protect the services running on the virtual machines. For example, the cloud account owner(s) 102 trust the cloud provider owner(s) 101 to not abuse the ultimate administrative rights to perform actions that may impact the security and confidentiality of the guest virtual machines run by the cloud account owner(s) 102, such as exposing the data the guest virtual machines contain. In another example, the cloud account owner(s) 102 trust the cloud provider owner(s) 101 not to duplicate the guest virtual machines or reverse engineering images, packages, and/or executable binaries to extract source codes of proprietary applications, etc. In another example, when granting a subset of administrative rights to the cloud account operator(s) 103, the cloud account owner(s) 102 trust the cloud account operator(s) 103 to perform duties without impacting the security and confidentiality of the guest virtual machines run by the cloud account owner(s) 102 and/or the data the guest virtual machines contain, e.g., trusting the cloud account operator(s) 103 to properly secure access to assets such as the codes 122 and the data 124 shown in FIG. 1, properly secure the access to the guest virtual machines so that certain interfaces and/or ports are not exposed, and/or properly secure certain virtual machine resources such as certain files.

In order to reduce the aforementioned implicit trust, in some embodiments, a vault owner 104 role is configured in the zero-trust system. In some embodiments, the vault owner 104 creates a vault to protect against security breach and the potential loss of secrets during cloud deployment despite the privileges held by other administrative users, e.g., the cloud provider owner(s) 101, the cloud account owner(s) 102, or the cloud account operator(s) 103. In some embodiments, once the cloud account owner(s) 102 configures the vault owner 104 with administrative privileges to lock and establish the vault around a guest virtual machine, the codes and/or data on the guest virtual machine are protected with a key unique to the deployment of the guest virtual machine. Accordingly, in the zero-trust system described herein, it is impossible to access the secrets from outside of the guest virtual machine, even by users with administrative privileges.

Figure 3:
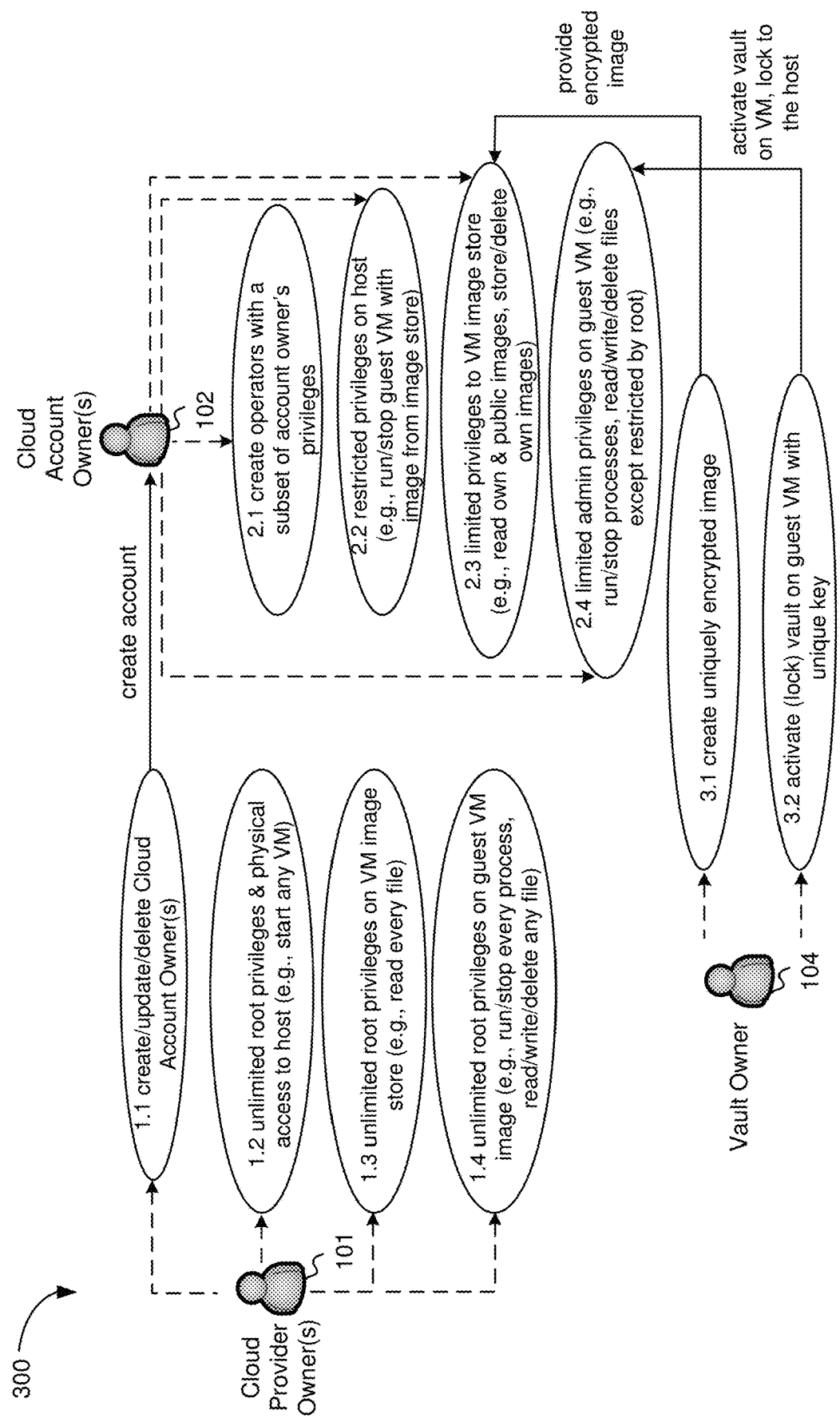
FIG. 3 is a diagram illustrating privileges and roles in zero-trust cloud deployment, in accordance with some embodiments.

FIG. 3 is a diagram 300 illustrating privileges and roles in zero-trust cloud deployment in accordance with various embodiments. In some embodiments, in step 1.1 when preparing guest VM deployment, the cloud provider owner(s) 101 with the unlimited rights and privileges manage the accounts of the cloud account owner(s) 102, e.g., creating, updating, and/or deleting the account(s) used by the cloud account owner(s) 102. Further, in step 1.2, with unlimited rights and privileges, e.g., root privileges and physical access to hosts such as the hardware 115 shown in FIG. 1, the cloud provider owner(s) 101 can start any virtual machine, including the guest VM managed by the cloud account owner(s) 102. Further, with unlimited root privileges, in step 1.3, the cloud provider owner(s) 101 have access to the virtual machine image store, e.g., the capability of reading every file in the virtual machine image store including the virtual machine image for the guest VM managed by the cloud account owner(s) 102. Further, in step 1.4, once the guest VM is deployed, the cloud provider owner(s) 102 have unlimited root privileges to access the guest VM image, e.g., running and stopping every process executed on the guest VM and reading, writing, or deleting any file on the guest VM.

In comparison, in step 2.1, the account(s) of the cloud account owner(s) 102 have the privileges to create account(s) for the cloud account operator(s) (e.g., the cloud account operator(s) 103 in FIGS. 1 and 2) and grant the cloud account operator(s) a subset of the privileges of the cloud account owner(s) 102. With the restricted privileges on the host owned by the cloud provider owner(s) 101, in step 2.2, the cloud account owner(s) 102 can run or stop the guest VM managed by the cloud account owner(s) 102 using the corresponding image from the virtual machine image store. When accessing the image from the virtual machine image store, because of the restricted privileges, the cloud account owner(s) 102 can access certain images in the virtual machine image store, such as read, store, and delete own images or reading public images in step 2.3. Further, with the restricted privileges, in step 2.4, the cloud account owner(s) 102 have limited administrative privileges on the guest VM. For example, the cloud account owner(s) 102 can run or stop processes except processes restricted by the cloud provider owner(s) 101 with the root privilege. In another example, the cloud account owner(s) 102 can read, write, or delete files except files restricted by the cloud provider owner(s) 101 with the root privilege.

As described above with reference to FIG. 2, because of the implicit trust among various actors in the system, in certain scenarios, once the trust is breached, the secrets in the deployed virtual machine can be compromised. When an unauthorized entity obtains administrative rights, e.g., as a result of wrong configuration or as a result of hacking, the unauthorized entity may gain access to the secrets on the guest VM with root privilege or limited administrative privileges. In another example, a disgruntled employee or administrator that has administrative privileges may misuse such privileges for their own gain. It is particularly problematic for large organizations that have a large pool of users configured as administrators. In yet another example, when proprietary applications or private data are stored using third party accounts with certain administrator privileges, without proper configuration, such third part administrator accounts may have access to private data, e.g., health data or keys, and/or codes.

To protect the secrets from potential misuse of privileges described above, in some embodiments, the vault owner 104 creates uniquely encrypted images in step 3.1 and provides the encrypted image to the virtual image store so that the cloud account owner(s) 102 and/or the vault owner 104 can securely access the images and install images on the guest VM. As such, the encrypted images form the base for a vault, which includes encrypted images and packages with a key known only to the vault owner 104. In some embodiments, step 3.1 is performed outside the cloud environment, and hence the secrecy and confidentiality are protected from other users associated with the cloud, including the cloud provider owner(s) 101, the cloud account owner(s) 102, and/or the cloud account operator(s) 103 (FIGS. 1 and 2). In step 3.2, the vault owner 104 creates or activates the vault, e.g., by enabling the guest VM and locking the guest VM to the host on behalf of the cloud account owner(s) 102 on a hardened VM image. As will be described in further detail below, in some embodiments, the vault owner 104 uses a unique key to protect the secrets so that after deployment and/or installation, the secrets in the cloud are protected from any users outside the guest VM, including users with administrative privileges.

Figure 4:
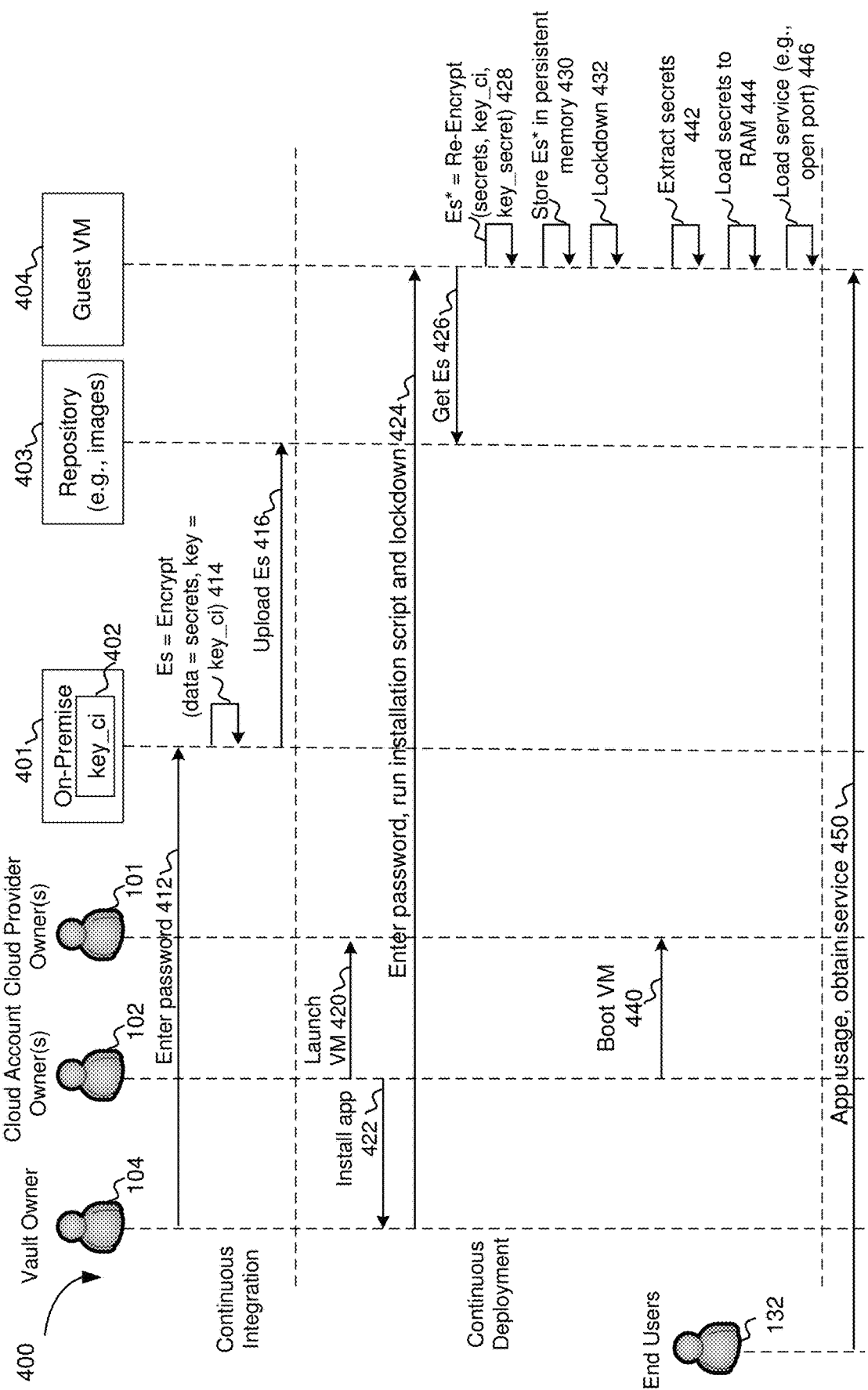
FIG. 4 is a sequence diagram illustrating zero-trust cloud deployment, in accordance with some embodiments.

FIG. 4 is a sequence diagram 400 illustrating zero-trust cloud deployment in accordance with some embodiments. In some embodiments, the cloud environment includes a guest VM 404 that is administrated by the cloud account owner(s) 102. In some embodiments, codes as well as data are uploaded and deployed from an on-premise device 401 owned by the vault owner 104 to the cloud. During the cloud deployment, in some embodiments, a cloud deployment repository 403 is used as an intermediate stage for the deployment, e.g., receiving the uploaded images, packages, and/or files from the on-premise device 401, storing the images, packages, and/or files, and providing the images, packages, and/or files to the guest VM 404 upon request.

In some embodiments, the zero-trust cloud deployment process includes a continuous integration phase for forming the base for a vault and a continuous deployment phaser for activating the vault for the protection of the guest VM 404. In some embodiments, the continuous integration phase starts with authenticating the vault owner 104, e.g., entering credentials such as password in step 412. To protect the secrets during continuous integration, in step 414, the vault owner 104 encrypts the secrets on the local on-premise device 401 using a key 402, e.g., Es=Encrypt (secrets, key_ci). In some embodiments, the secrets exist on the on-premise device 401 in the clear, i.e., unencrypted, and such secrets include, but are not limited to, application source codes, compiled codes, executable codes, packages, private data, credentials, keys for cryptographic operations. Further, in some embodiments, key_ci is guarded by the vault owner 104 so that the secrets are protected during the upload from the on-premise device 401 to the cloud deployment repository 403 in step 416. In some embodiments, the secrets are stored in the encrypted form in the cloud deployment repository 403, e.g., encrypted with key_ci, where key_ci is known only to the vault owner 104.

As described above, in every virtual machine deployment, metadata files are uploaded in step 416 along with codes and data. In some embodiments, certain metadata files describe the logical guest VM 404 associated with the deployment of the guest VM 404, e.g., the instance ID, the creation time, and/or the modification time associated with the deployed guest VM 404. As such, when the cloud account owner(s) 102 request the cloud provider owner(s) 101 to launch the guest VM 404 during continuous deployment in step 420, the metadata files are automatically modified, e.g., on any cloning or mounting request.

In some embodiments, in step 422, the cloud account owner(s) 102 allow the vault owner 104 to install applications, e.g., as application containers on the guest VM 404. In some embodiments, once authenticated, the vault owner 104 runs installation script(s), and locks down the guest VM 404 in step 424, e.g., by removing remote services such as removing secure shell (SSH) keys and disabling remote access such as remote system or agent management. In some embodiments, as shown in FIG. 4, the step 424 is performed by the vault owner 104, whose administrative rights are configured and granted by the cloud account owner(s) 102. Alternatively, in some embodiments, step 412 is performed by the cloud account owner(s) 102.

Continuing with the cloud deployment, in step 426, the guest VM 404 obtains the images, packages, and/or files, along with the deployment metadata from the cloud deployment repository 403. Upon obtaining the deployment metadata, in step 428, the guest VM 404 re-encrypts the secrets before storing the re-encrypted secrets in the persistent memory in the cloud in step 430. In some embodiments, instead of (or in addition to) performing the lock down in step 424, the lock down is performed in step 432 so that remote access to the guest VM 404 is disabled. While locking down the guest VM 404 prevents remotely accessing the secrets, malicious users may still attempt to gain access to the information on the guest VM 404 via attacks such as cloning. To further prevent cloning attacks, where the attacker clones the guest VM 404 and reads the codes and data from the clone, steps 428 is performed by the vault owner 104 to encrypt the secrets.

In some embodiments, the re-encryption in step 428 is performed by decrypting the secrets using key_ci and encrypting the decrypted secrets using a key (denoted as key_secret) derived from the unique deployment metadata, e.g., secrets=Decrypt (Es, key_ci) followed by Es*=Encrypt (secrets, key_secret). In some embodiments, during the decryption process, key_ci is safeguarded using volatile memory (RAM) in the locked down guest VM 404. In other words, key_ci is safe guarded on-premise and not stored on the guest VM 404 or in the cloud. In some embodiments, key_secret is derived from one or more seeds, which are further calculated based on the deployment metadata associated with the guest VM 404, e.g., deriving the seed(s) by applying a function to the deployment metadata associated with the guest VM 404. For example, the seed(s) can be calculated by applying a function to the instance ID, the creation time, and/or the modification time of the guest VM 404.

Because the key_secret is derived using codes running inside the guest VM 404 and using the deployment metadata that are unique to the deployment of the guest VM 404, it is impossible to obtain the key_secret and decrypt the encrypted secrets from outside the guest VM 404. Thus, the zero-trust cloud deployment solution described herein makes the seed(s), the key_secret, and more importantly the secrets inaccessible by users with administrative privileges from outside the guest VM 404, including the cloud account owner(s) 102, the cloud provider owner(s) 101, and/or the cloud account operator(s) 103. Even if cloning attacks are initiated by such users with administrative privileges, because the key_secret changes with each cloning, the secrets are inaccessible on the cloned machine.

Figure 5:
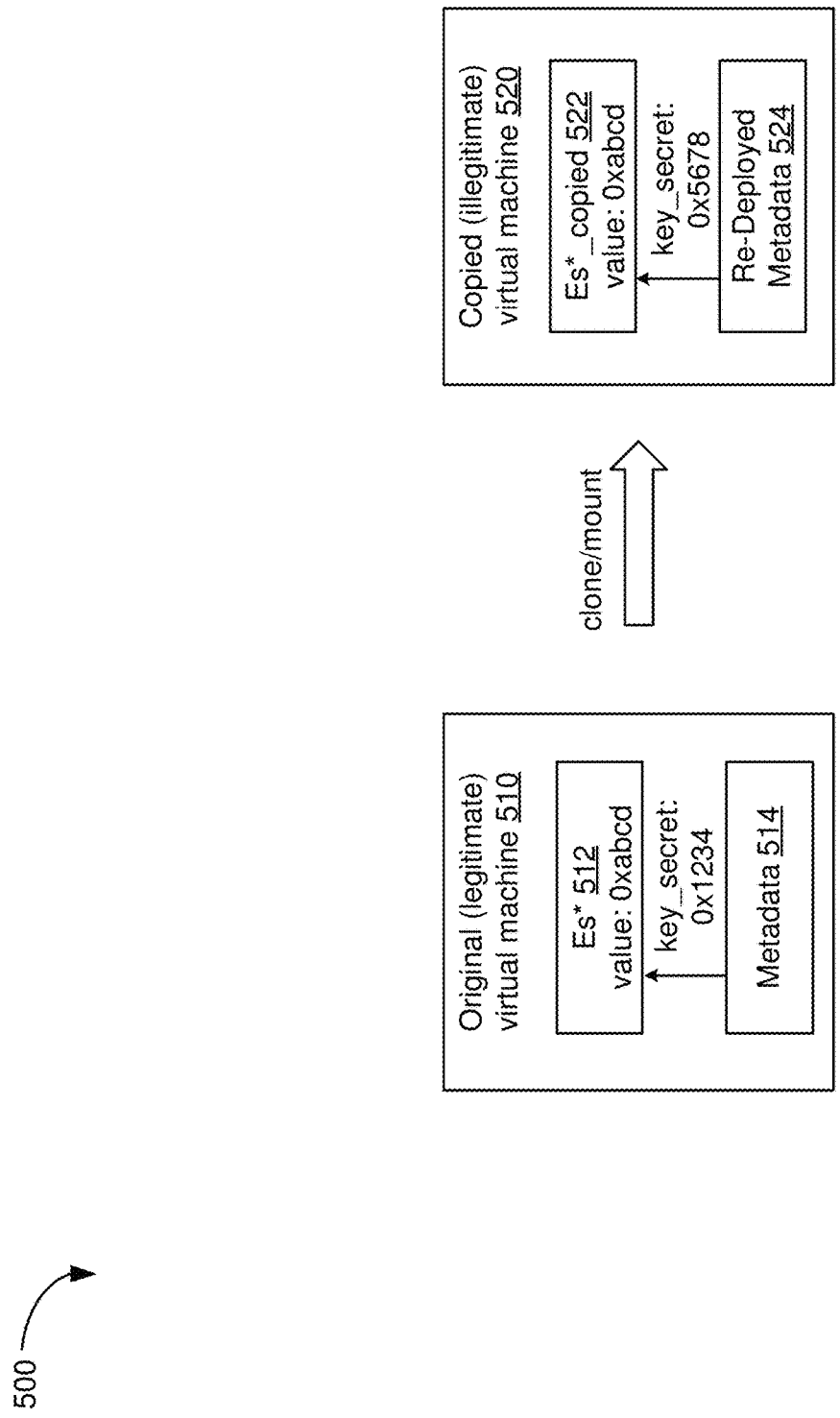
FIG. 5 is a diagram illustrating applying zero-trust cloud deployment to prevent cloning attacks, in accordance with some embodiments.

For example, FIG. 5 is a diagram 500 illustrating applying the zero-trust cloud deployment described herein to prevent cloning attacks in accordance with some embodiments. As shown in FIG. 5, an original (e.g., legitimate) virtual machine 510 stores encrypted secrets Es* 512 in the persistent memory with value 0xabcd, where Es* 512 is encrypted using the key_secret value 0x1234 calculated based on deployment metadata 514 associated with the original virtual machine 510. In the case of a cloning attack on the original legitimate virtual machine 510, e.g., either cloning or mounting from another machine to generate a copied (e.g., illegitimate) virtual machine 520 with copied encrypted secrets, e.g., Es* copied 522, the value of Es* copied 522 is the same as Es* 512, e.g., both are 0xabcd. However, the value of the key_secret has changed to 0x5678 because re-deployed metadata 524 associated with the copied virtual machine 520 are automatically modified during the mounting, e.g., the re-deployed metadata 524 are different from the metadata 514. Accordingly, it is impossible to decrypt Es* copied 522 to derive the secrets, thus protecting the secrets from cloning attacks.

Referring back to FIG. 4, because the solution described herein utilizes existing files in the cloud infrastructure, e.g., metadata files for cloud deployment, it does not require integration with the cloud provider, thus keeping the integration cost low. In some embodiments, with some integration effort, the cloud provider allocates files and/or generating scripts for deriving seeds to improve the robustness and flexibility of the zero-trust deployment. For example, in addition to using the seed(s) derived from the deployment metadata associated with the guest VM 404, the key_secret can also be based on an additional seed derived from files allocated by the cloud provider. Using the key_secret derived from both the seed(s) associated with the guest VM 404 and the seed associated with the cloud provider prevents attacks in case of the accounts associated with the cloud provider owner(s) 101 being compromised.

Still referring to FIG. 4, having locked the guest VM 404, in step 440, the cloud account owner(s) 102 request the cloud provider owner(s) 101 to boot up the guest VM 404. Once booted, services on the guest VM 404 are up and running, e.g., services provided by deployed applications running in containers and/or using the data on the guest VM 404. In particular, in step 442, the secrets are extracted for services. In some embodiments, the secrets are extracted by calculating the key_secret from the deployment metadata, e.g., an in-RAM operation, and applying the key_secret to decrypt the encrypted secrets stored in the persistent memory, e.g., secrets=Decrypt (Es*, key_secret). In some embodiments, the extracted secrets are loaded to the RAM in the cloud in step 444 for providing services. The services are then loaded in step 446 (e.g., open port) and the application deployed on the guest VM 404 in the cloud are then accessible by the end users 132 in step 450.

As shown in FIG. 4, using zero-trust cloud deployment described herein, packages and images are secure during the continuous integration phase when establishing the base for the vault, e.g., encrypted when uploading from the on-premise device 401 to the cloud deployment repository 403 and then to the guest VM 404. Further, once installed on the guest VM 404, the lock down in steps 424 and/or 432 establishes the vault to protect the applications running on the guest VM 404 while the applications provide to the end users 132 services such as serving application programming interfaces (APIs), computing and generating data, etc. At the same time, the vault prevents attacks initiated remotely (e.g., via SSH, SSM, etc.) and locally (e.g., through cloning or retrieving information from the hardware hosting the guest VM 404). In particular, users with administrative privileges, such as the cloud account owner(s) 102, the cloud account operator(s) 103 (FIGS. 1 and 2) can perform tasks such as accessing machine status, terminating application, retrieving logs, generating metrics and alarms, but cannot access the secrets from outside the guest VM 404.

Figure 6A:
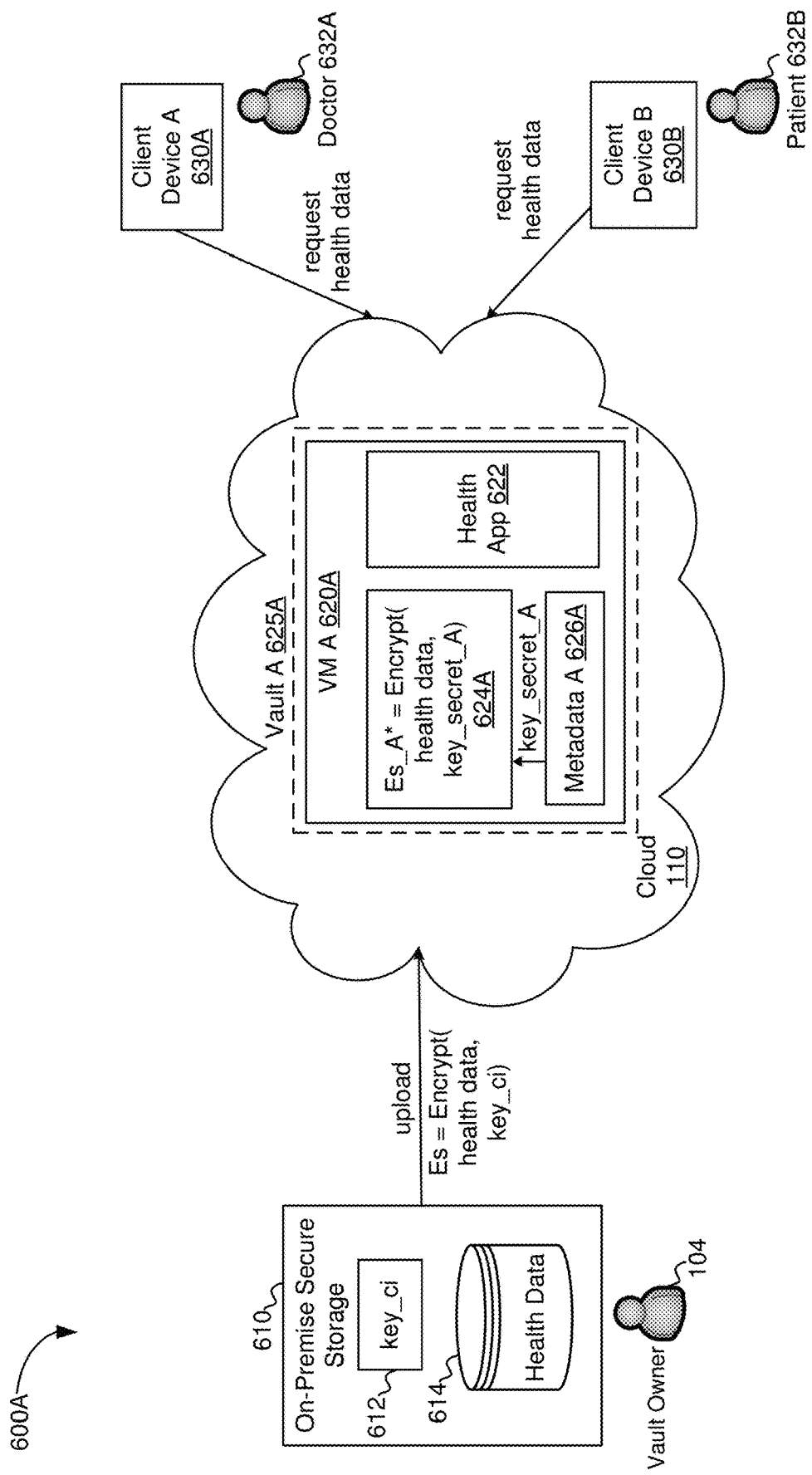
FIGS. 6A-6C are diagrams illustrating restoring secrets with zero-trust cloud deployment, in accordance with some embodiments.
Figure 6B:
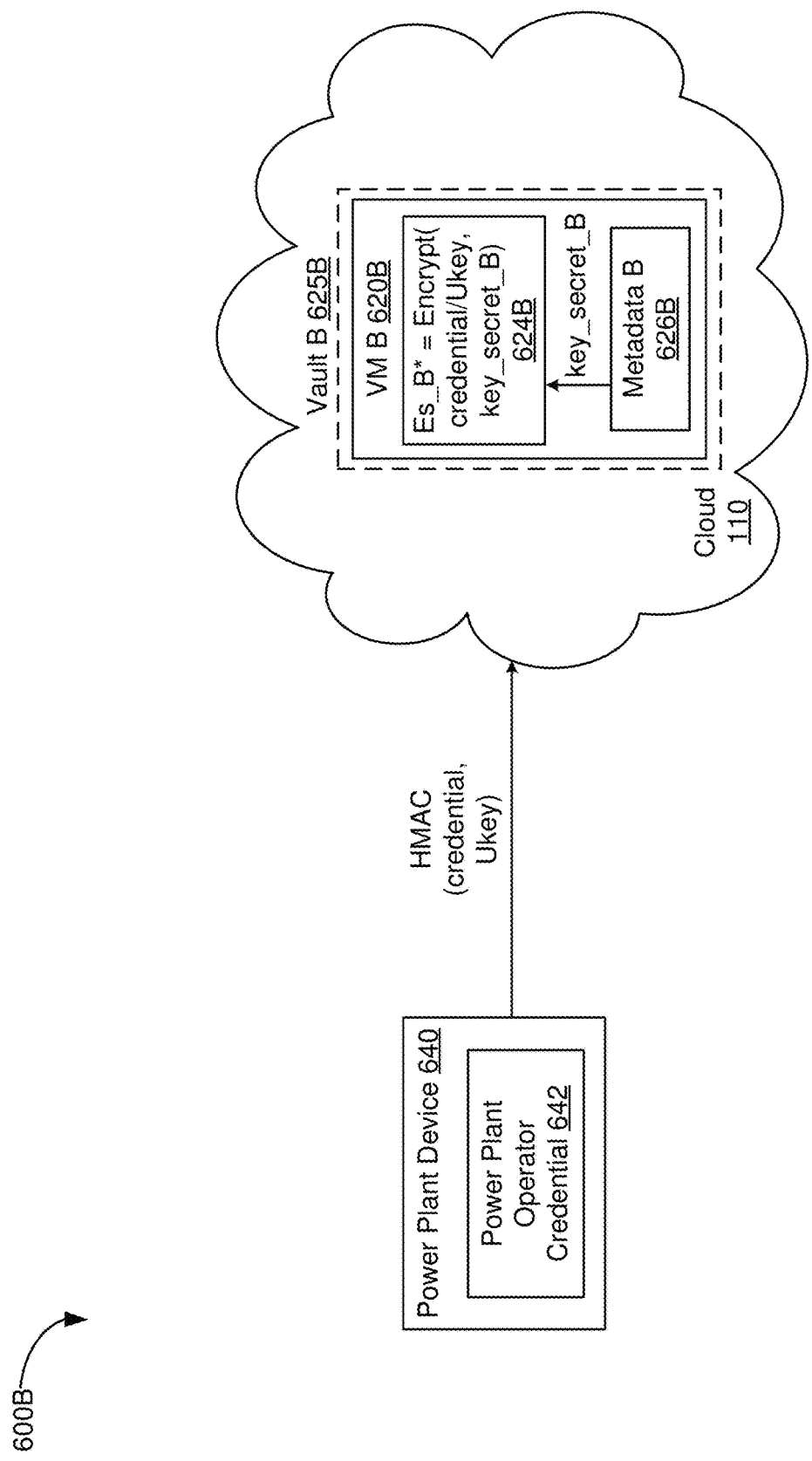
Figure 6C:
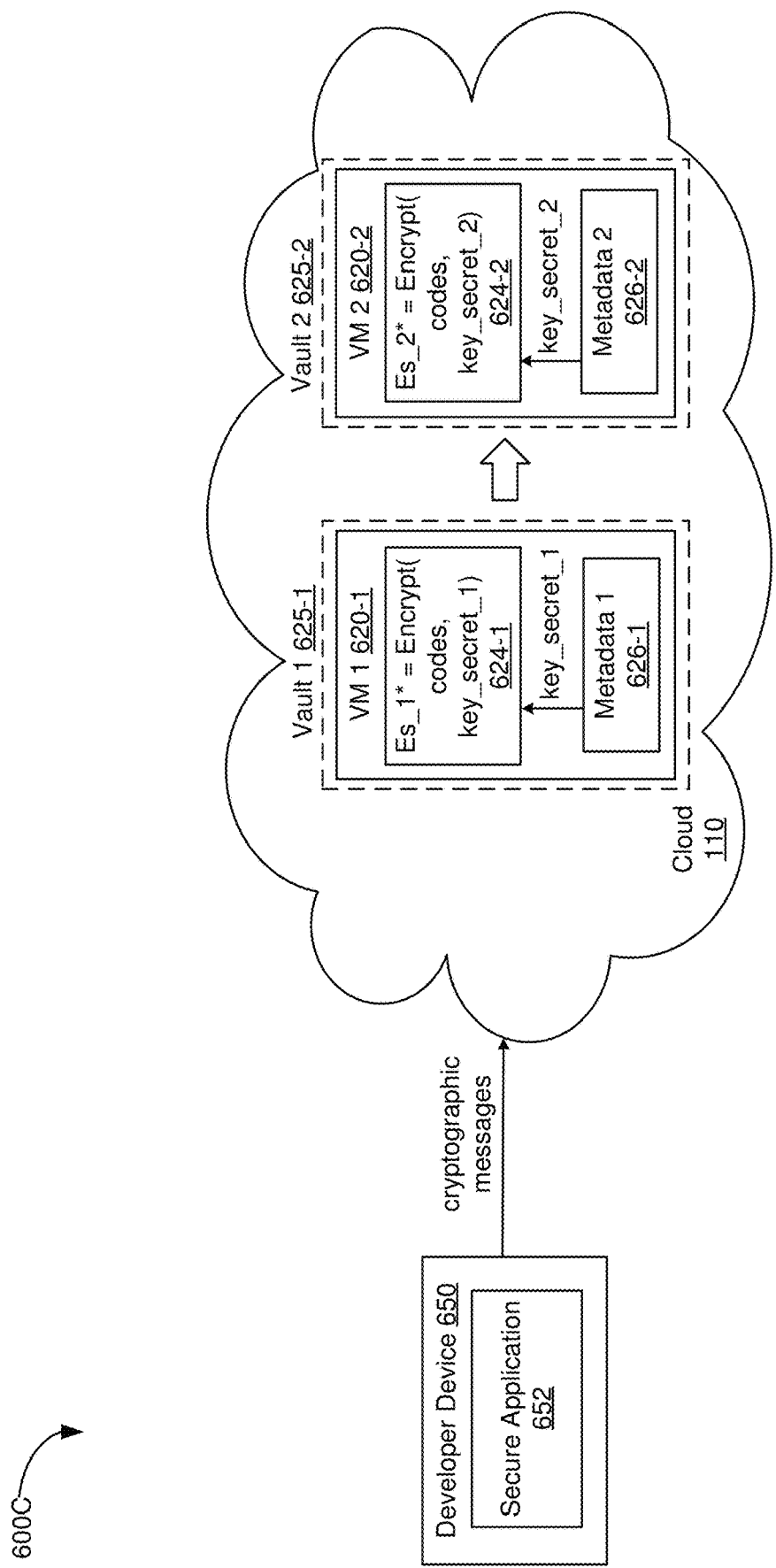

FIGS. 6A-6C are diagrams 600A-600C illustrating restoring secrets in the zero-trust system described herein in accordance with various embodiments. In FIG. 6A, the secrets include health data 614 that are stored in an on-premise secure storage 610, e.g., the on-premise device 401 in FIG. 4. In some embodiments, the on-premise secure storage 610 resides on the vault owner's premise, e.g., on a local machine owned and/or managed by the vault owner 104 and the health data 614 are stored in clear (e.g., in an unencrypted form) on the local machine. In some embodiments, the on-premise secure storage 610 also securely stores key_ci 612. In some embodiments, key_ci 612 is used for encrypting the health data 614 when the health data is communicated off premise, e.g., when uploading the health data 614 encrypted with key_ci 612 from the on-premise secure storage 610 to the cloud 110.

Following the steps described above with reference to FIG. 4, the health data 614 are uploaded in a first encrypted form to virtual machine A 620A, e.g., encrypted using key_ci 612, and stored in a second encrypted form in the persistent memory of the virtual machine in the cloud 110, e.g., encrypted using key_secret_A. Also as described with reference to FIG. 4, vault A 625A is created by locking down virtual machine A 620A and encrypting the health data 614 using key_secret_A derived from deployment metadata A 626A associated with virtual machine A 620A, e.g., Es_A*=Encrypt (health data, key_secret_A).

When the end users, such as a doctor 632A and a patient 632B, request the health data 614 through a health application 622 running in the virtual machine 620, e.g., from client device A 630A and client device B 630B, respectively, the stored encrypted secrets are decrypted and the decrypted secrets are loaded to the RAM for computing and generating results to provide to the doctor 632A and the patient 632B. In the case of the vault 625 being deleted and the secrets being removed from virtual machine A 620A, because the secrets Es_A* 624A are stored in the encrypted form in the persistent memory, the secrets Es_A* 624A are protected from users outside virtual machine A 620A, e.g., protected against accessing the health data. Further, in some embodiments, to restore the health data, a secure restore process in performed on-premise, e.g., retrieving the health data 614 from the on-premise secure storage 610, encrypting using key_ci 612, and securely uploading to the cloud 110 with re-established vault A 625A protecting virtual machine A 620A.

In FIG. 6B, the secrets include a power plant operator credential 642 maintained on a power plant device 640. Following the steps described above with reference to FIG. 4, the power plant operator credential 642 is securely uploaded to virtual machine B 620B, and the secure application 642 is securely uploaded to virtual machine B 620B. To securely upload the secrets, the power plant operator credential 642 can be securely uploaded, for example, using Hash-based Message Authentication Code (HMAC) calculated based on the power plant operator credential 642 and a secret shared key (Ukey). The credential and/or Ukey are then stored in the cloud 110 in the encrypted form 624B, e.g., Es_B*=Encrypt (credential/Ukey, key_secret_B) where key_secret_B is derived from deployment metadata B 626B associated with virtual machine B 620B. Accordingly, vault B 625B is created by locking down virtual machine B 620B and encrypting the power plant operator credential and/or Ukey using key_secret_1.

In the case of vault B 625B being deleted and the secrets being removed from the virtual machine 620, because the encrypted secrets Es_B* 624B are stored encrypted in the persistent memory, the power plant operator credential 642 is protected from users outside virtual machine B 620B. Further, in some embodiments, to recover the secrets on virtual machine B 620B, a new power plant operator credential 642 is created on the power plant device 640 and securely sent to virtual machine B 620B, e.g., by sending a secure one-time-password (OTP). The secrets are then restored on virtual machine B 620B by re-establishing vault B 625B using key_secret_B.

In FIG. 6C, the secrets include a secure application 652 stored on a developer device 650, e.g., the developer device 650 storing the source codes, compiled codes, and/or executable codes corresponding to the secure application 652. Following the steps described above with reference to FIG. 4, the secure application 652 is securely uploaded to virtual machine 1 620-1. To securely upload the secrets, the secure application 652 can be securely uploaded using cryptographic messages. The codes corresponding to the secure application 652 are then stored in the cloud 110 in the encrypted form 624-1, e.g., Es_1*=Encrypt (codes, key_secret_1) where key_secret_1 is derived from deployment metadata 1 626-1 associated with virtual machine 1 620-1. Accordingly, vault 1 625-1 is created by locking down virtual machine 1 620-1 and encrypting the codes corresponding to the secure application 652 using key_secret_1.

In the case of vault 1 625-1 being deleted and the secrets being removed from virtual machine 1 620-1, because the encrypted secrets Es_1* 624-1 are stored encrypted in the persistent memory, the secure application 652 is protected from users outside the virtual machine 620, e.g., protected against reverse engineering the executable codes. Further, in some embodiments, once the secure application is re-deployed on virtual machine 2 625-2 following the process described with reference to FIG. 4, vault 2 625-2 is created for the protection of virtual machine 2 620-2 using key_secret_2 derived from deployment metadata 2 626-2. Once vault 2 625-2 is established, the secure application resumes providing services to the end users. As such, the vault provided by the combination of the lock down and the encryption using key_secret is robust against standard maintenance procedures such as virtual machine reboot, hardware replacement, and/or re-deployment.

Figure 7A:
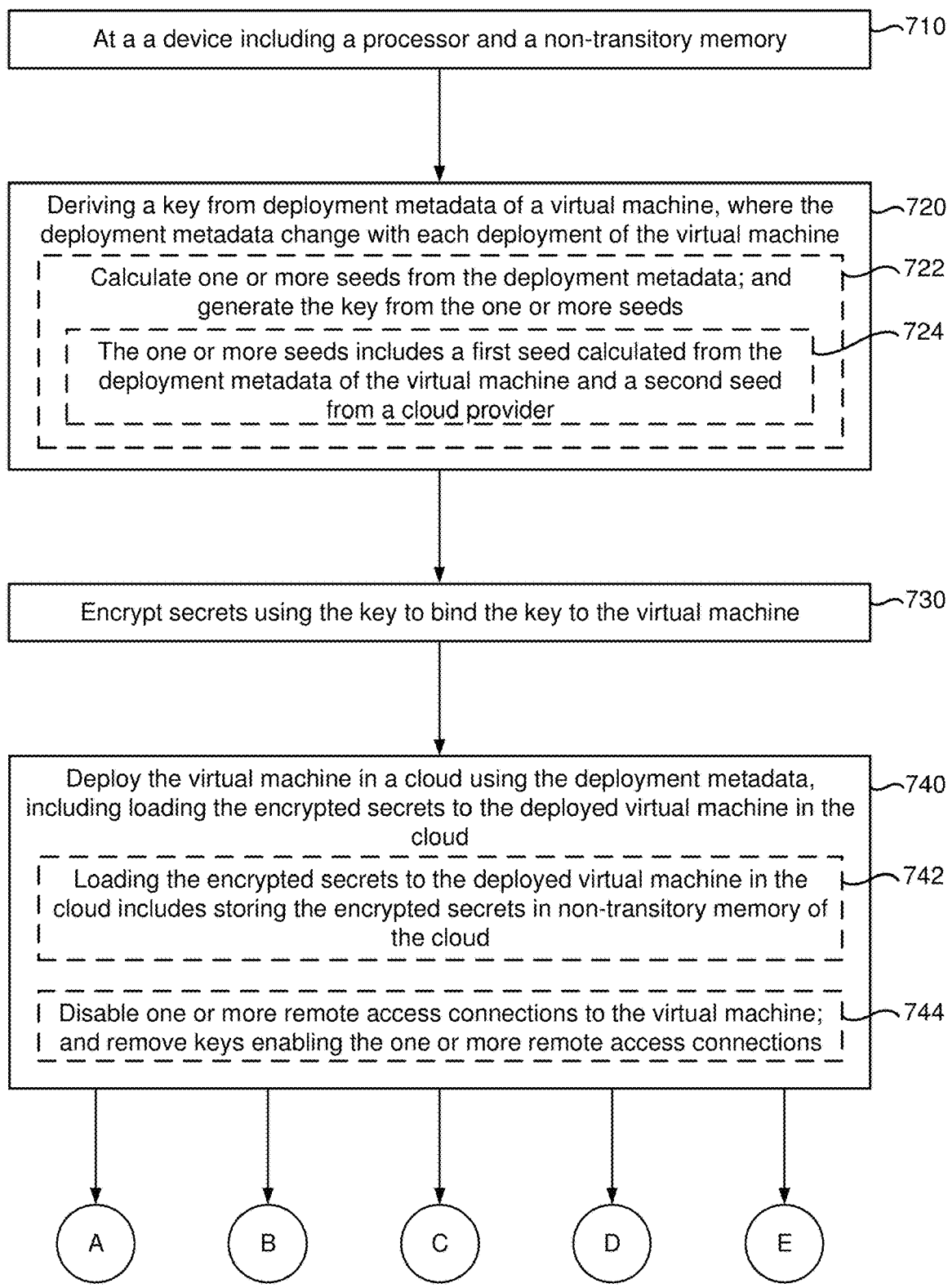

FIGS. 7A-7C are flow diagrams illustrating a zero-trust cloud deployment method 700 in accordance with some embodiments. As represented by block 710 in FIG. 7A, in some embodiments, the method 700 is performed at a device that includes a processor and a non-transitory memory, e.g., a device used by the vault owner 104 such as the on-premise device 401 in FIG. 4, the device hosting the cloud deployment repository 403, and/or a device with access to the cloud for deploying the guest VM 404 shown in FIG. 4.

The method 700 begins with the device deriving a key from deployment metadata of a virtual machine, where the deployment metadata change with each deployment of the virtual machine as represented by block 720. For example, at least a portion of the metadata 126 (FIG. 1) associated with the deployment of the virtual machine 120 can be used for deriving key_secret shown in FIGS. 4, 5, and 6A-6C. As shown in FIG. 5, because the deployment metadata 514 changes with each deployment of the virtual machine, when the original virtual machine 510 is copied and re-deployed as the copied virtual machine 520, the deployment metadata 514 change into re-deployment metadata 524 on the copied virtual machine 520. As such, as shown in FIG. 5, key_secret derived from the deployment metadata 514 has a different value from key_secret derived from the re-deployment metadata 524.

In some embodiments, as represented by block 722, deriving the key from the deployment metadata of the virtual machine includes calculating one or more seeds from the deployment metadata, and generating the key from the one or more seeds, e.g., calculating key_secret using seed(s) that are further calculated based on the deployment metadata. Further in such embodiments, as represented by block 724, the one or more seeds includes a first seed calculated from the deployment metadata of the virtual machine and a second seed from a cloud provider. As such, using the second seed from the cloud provider as the additional seed, key_secret derived from the both the first seed and the second seed prevents the scenario of an attack by the cloud provider itself.

The method 700 continues, as represented by block 730, with the device encrypting secrets (e.g., the codes 122 and/or the data 124 in FIG. 1) using the key to bind the key to the virtual machine. For example, in FIG. 6A, Es_A* 624A is calculated by encrypting the secrets, which include the health data 614, using key_secret_A, e.g., Es_A*=Encrypt (health data, key_secret_A). In another example, in FIG. 6B, Es_B* 624B is calculated by encrypting the secrets, which include the power plant operator credential 642 and/or the secret shared key, using key_secret_B, e.g., Es_B*=Encrypt (credential/Ukey, key_secret_B). In yet another example, in FIG. 6C, Es_1* 624-1 is calculated by encrypting the secrets, which include the secure application 652, using key_secret_1, e.g., Es_1*=Encrypt (codes, key_secret_1).

As represented by block 740, the method 700 continues with the device deploying the virtual machine in a cloud using the deployment metadata, including loading the encrypted secrets to the deployed virtual machine in the cloud. In some embodiments, as represented by block 742, loading the encrypted secrets to the deployed virtual machine in the cloud includes storing the encrypted secrets in non-transitory memory of the cloud. For example, in FIG. 4, in step 430, the encrypted secrets Es* are installed and stored in the persistent memory of the guest VM 404, e.g., storing encrypted credentials as shown in FIG. 6B, encrypted codes associated with applications as shown in FIG. 6C, and/or encrypted data as shown in FIG. 6A.

In some embodiments, as represented by block 744, deploying the virtual machine in the cloud using the deployment metadata includes disabling one or more remote access connections to the virtual machine, and removing keys enabling the one or more remote access connections. For example, as shown in FIG. 4, in order to establish the vault protecting the guest VM 404, the vault owner 104 performs lockdown in step 424 and/or step 432 to close remote access to the guest VM 404 except legitimate access though APIs.

Turning to FIG. 7B, in some embodiments, as represented by block 750, the secrets are uploaded from a local repository as encrypted secrets to a repository for deployment to the cloud, and the method further includes generating the encrypted secrets using a local key stored on-premise. In such embodiments, as represented by block 752, the method 700 further includes obtaining the encrypted secrets from the repository for deployment to the cloud, and decrypting the encrypted secrets using the local key to derive the secrets. For example, in FIG. 4, the secrets are encrypted using the local key key_ci stored on-premise in step 414, and in step 416, the encrypted secret Es is uploaded from the local repository on the on-premise device 401, to the cloud deployment repository 403 that has images for deployment to the cloud. The packages and/or images encrypted using key_ci thus form the base for the vault and the secrecy and confidentiality of the secrets are assured against users other than the vault owner 104. Further as shown in FIG. 4, during continuous deployment, the encrypted secrets are obtained (e.g., pulled) from the cloud deployment repository 403 in step 426 and the secrets are decrypted first during the re-encryption in step 428 using key_ci, e.g., secret=Decrypt (Es, key_ci).

In some embodiments, as represented by block 760, the method 700 further includes calculating the key from the deployment metadata after booting the virtual machine in the cloud, and decrypting the encrypted secrets to generate unencrypted secretes without storing the unencrypted secrets in non-transitory memory in the cloud. For example, in FIG. 4, after booting up the guest VM 404 in step 440, the secrets are extracted in step 442, e.g., by decrypting Es* using key_secret, but the clear secrets are not stored on the persistent memory. Instead, also shown in FIG. 4, in step 444, the secrets are loaded to the RAM for providing services.

In some embodiments, as represented by block 770, when the encrypted secrets include encrypted data, e.g., the encrypted health data 624A in FIG. 6A, the method 700 further includes: (a) obtaining data corresponding to the encrypted data, wherein the data are encrypted using an on-premise key; and (b) restoring the encrypted data on the virtual machine in the cloud by decrypting the data using the on-premise key and re-encrypting the data using the key. For example, in FIG. 6A, in order to restore the secrets 624A in the cloud 110, the health data 614 are securely obtained from the on-premise secure storage 610, e.g., encrypted using the on-premise key key_ci, and the encrypted health data are re-encrypted by decrypting the encrypted health data using key_ci followed by encrypting the health data using key_secret.

Turning to FIG. 7C, as represented by block 780, in some embodiments, when the encrypted secrets include an encrypted credential, e.g., the encrypted power plant operator credential (and/or the secret shared key Ukey) 624 in FIG. 6B, and the method 700 further includes: (a) obtaining an updated encrypted credential corresponding to the encrypted credential using a one-time password; and (b) replacing the encrypted credential on the virtual machine in the cloud by loading the updated encrypted credential to the deployed virtual machine in the cloud, decrypting the updated encrypted credential using the one-time password, and re-encrypting the updated encrypted credential using the key. For example, in FIG. 6B, in the case of vault B 625B being compromised, to restore the encrypted secrets 624B in the cloud, a new power plant operator credential is included in the HMAC message, and an OTP is sent from the power plant device 640 to the cloud 110. The encrypted power plant operator credential 624B is then replaced with the updated encrypted power plant operator credential following the steps 428 and 430 described in FIG. 4.

In some embodiments, as represented by block 790, when the encrypted secrets include an encrypted executable package corresponding to an application (e.g., the encrypted codes 624-1 corresponding to the secure application 652 in FIG. 6C), the method 700 further includes: (a) obtaining the application via cryptographic messaging; (b) deriving an updated key from updated deployment metadata of the virtual machine; (c) encrypting an executable package corresponding to the application using the updated key to generate an updated encrypted package and bind the updated key to the virtual machine; and (d) re-deploying the virtual machine in the cloud using the updated deployment metadata, including loading the updated encrypted package to the re-deployed virtual machine in the cloud. For example, in FIG. 6C, in case of vault 1 625-1 is deleted, vault 2 625-2 is created with the secure application 652 securely uploaded to the cloud 110 via cryptographic messages and re-deploy the secure software application following the step 428 and 430 described in FIG. 4 before onboarding the users.

Figure 8:
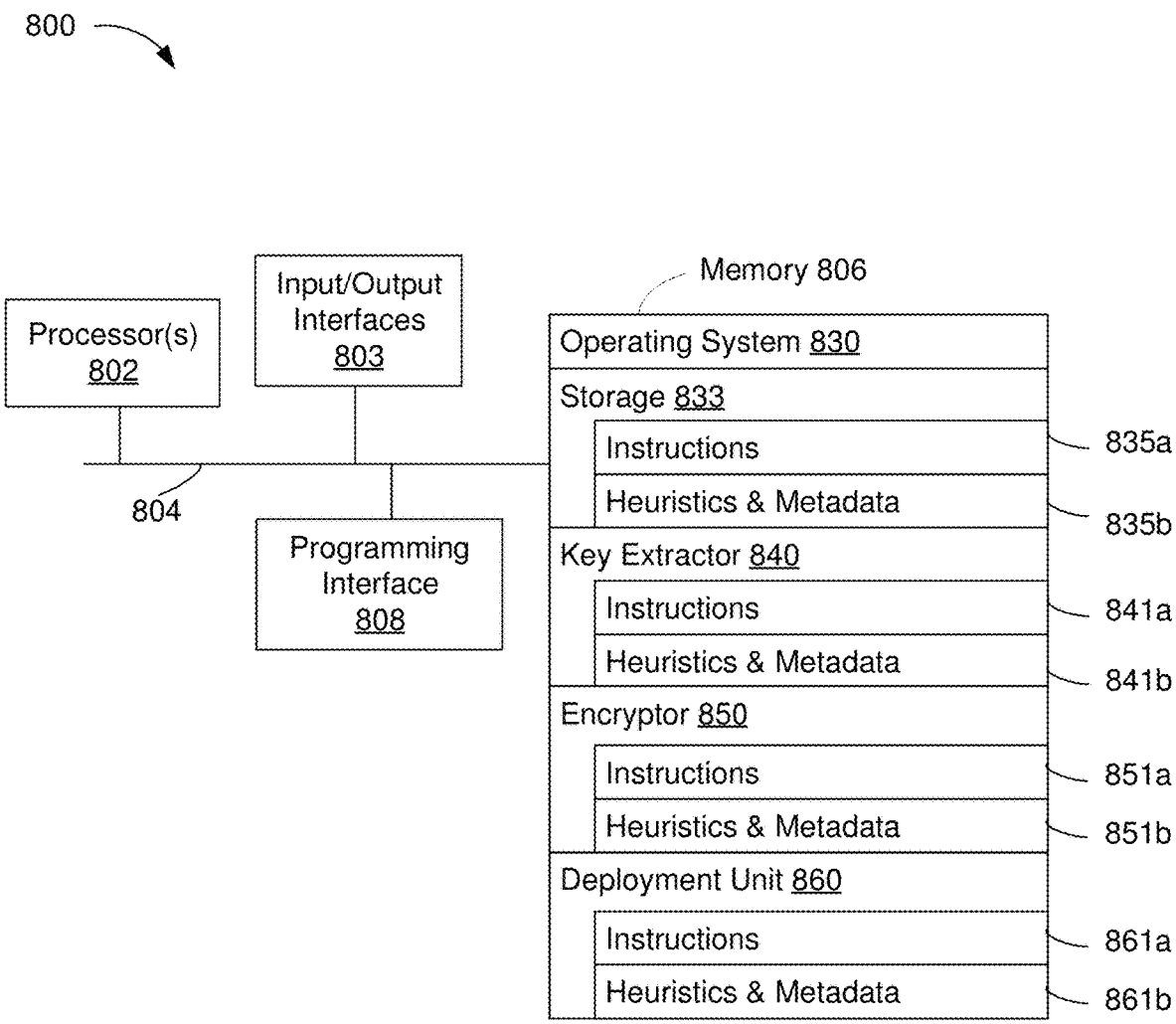
FIG. 8 is a block diagram of a computing device for facilitating zero-trust cloud deployment, in accordance with some embodiments.

FIG. 8 is a block diagram of a computing device 800 for facilitating zero-trust cloud deployment in accordance with some embodiments. In some embodiments, the computing device 800 performs one or more functions of one or more servers hosting the cloud 110 (FIG. 1) and performs one or more of the functionalities described above with respect to the cloud 110 (FIG. 1). While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units 802 (e.g., CPU and/or GPU as part of the hardware 115 in FIG. 1), one or more input/output interfaces 803 (e.g., input devices, sensors, a network interface, a display, etc.), a memory 806 (e.g., also as part of the hardware 40 in FIG. 1), a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830, a storage module 833, a key extractor 840, an encryptor 850, and a deployment unit 860. In some embodiments, one or more instructions are included in a combination of logic and non-transitory memory. The operating system 830 includes procedures for handling various basic system services and for performing hardware dependent tasks.

In some embodiments, the storage module 833 stores data related to zero-trust cloud deployment, e.g., the codes 122, the data 124, and/or the metadata 126 for virtual machines 120 in FIG. 1. To that end, the storage module 833 includes a set of instructions 835a and heuristics and metadata 835b.

In some embodiments, the key extractor 840 is configured to derive a key from deployment metadata associated with virtual machines. To that end, the key extractor 840 includes a set of instructions 841a and heuristics and metadata 841b. In some embodiments, the key extractor 840 includes codes (e.g., the codes 122 in FIG. 1 and/or an application corresponding to at least a subset of the codes) that are executable on a respective virtual machine, e.g., as a container and configured to derive a unique key from the deployment metadata associated with the respective virtual machine.

In some embodiments, the encryptor 850 is configured to encrypt secrets stored in the cloud within each virtual machine, e.g., encrypting codes, data, and/or metadata stored in the persistent memory of the hardware hosting the virtual machines. In some embodiments, at least a portion of the metadata include deployment metadata of virtual machines, where the deployment metadata for a respective virtual machine change with each deployment of the respective deployment metadata. To that end, the encryptor 850 includes a set of instructions 851a and heuristics and metadata 851b. In some embodiments, the encryptor 850 includes codes (e.g., the codes 122 in FIG. 1 and/or an application corresponding to at least a subset of the codes) that are executable on a respective virtual machine, e.g., as a container and configured to encrypt the secrets stored in the respective virtual machine.

In some embodiments, the deployment unit 860 is configured to deploy virtual machines using the deployment metadata, where the deployment includes loading secrets encrypted by the encryptor 850 to the respective deployed virtual machine in the cloud. To that end, the deployment unit 860 includes a set of instructions 861a and heuristics and metadata 861*b*. In some embodiments, to deploy the virtual machines, the deployment unit 860 follows the steps illustrated in FIG. 4 to securely load stored secrets from deployment repository 403 to the cloud.

Although the storage module 833, the key extractor 840, the encryptor 850, and the deployment unit 860 are illustrated as residing on a single computing device 800, it should be understood that in other embodiments, any combination of the storage module 833, the key extractor 840, the encryptor 850, and the deployment unit 860 can reside on separate computing devices. For example, in some embodiments, each of the storage module 833, the key extractor 840, the encryptor 850, and the deployment unit 860 resides on a separate computing device.

Moreover, FIG. 8 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a device including a processor and a non-transitory memory:
deriving a key from deployment metadata of a virtual machine, wherein the deployment metadata change with each deployment of the virtual machine;
encrypting secrets using the key to bind the key to the virtual machine; and
deploying the virtual machine in a cloud using the deployment metadata, including loading the encrypted secrets to the deployed virtual machine in the cloud.

2. The method of claim 1, wherein deriving the key from the deployment metadata of the virtual machine includes:
calculating one or more seeds from the deployment metadata; and
generating the key from the one or more seeds.

3. The method of claim 2, wherein the one or more seeds includes a first seed calculated from the deployment metadata of the virtual machine and a second seed from a cloud provider.

4. The method of claim 1, wherein loading the encrypted secrets to the deployed virtual machine in the cloud includes:
storing the encrypted secrets in non-transitory memory of the cloud.

5. The method of claim 1, wherein deploying the virtual machine in the cloud using the deployment metadata includes:
disabling one or more remote access connections to the virtual machine; and
removing keys enabling the one or more remote access connections.

6. The method of claim 1, wherein:
the secrets are uploaded from a local repository as locally encrypted secrets to a repository for deployment to the cloud; and
the method further includes generating the locally encrypted secrets using a local key stored on-premise.

7. The method of claim 6, further comprising:
obtaining the locally encrypted secrets from the repository for deployment to the cloud; and
decrypting the locally encrypted secrets using the local key to derive the secrets.

8. The method of claim 1, further comprising:
calculating the key from the deployment metadata after booting the virtual machine in the cloud; and
decrypting the encrypted secrets to generate unencrypted secrets without storing the unencrypted secrets in non-transitory memory of the cloud.

9. The method of claim 1, wherein the encrypted secrets include encrypted data, and the method further includes:
   obtaining data corresponding to the encrypted data, wherein the data are encrypted using an on-premise key; and
   restoring the encrypted data on the virtual machine in the cloud by decrypting the data using the on-premise key and re-encrypting the data using the key.

10. The method of claim 1, wherein the encrypted secrets include an encrypted credential, and the method further includes:
    obtaining an updated encrypted credential corresponding to the encrypted credential using a one-time password; and
    replacing the encrypted credential on the virtual machine in the cloud by loading the updated encrypted credential to the deployed virtual machine in the cloud, decrypting the updated encrypted credential using the one-time password, and re-encrypting the updated encrypted credential using the key.

11. The method of claim 1, wherein the encrypted secrets include an encrypted executable package corresponding to an application, and the method further includes:
    obtaining the application via cryptographic messaging;
    deriving an updated key from updated deployment metadata of the virtual machine;
    encrypting an executable package corresponding to the application using the updated key to generate an updated encrypted package and bind the updated key to the virtual machine; and
    re-deploying the virtual machine in the cloud using the updated deployment metadata, including loading the updated encrypted package to the re-deployed virtual machine in the cloud.

12. A non-transitory memory storing one or more programs, which, when executed by one or more servers, cause the one or more servers to:
    derive a key from deployment metadata of a virtual machine, wherein the deployment metadata change with each deployment of the virtual machine;
    encrypt secrets using the key to bind the key to the virtual machine; and
    deploy the virtual machine in a cloud using the deployment metadata, including loading the encrypted secrets to the deployed virtual machine in the cloud.

13. The non-transitory memory of claim 12, wherein deriving the key from the deployment metadata of the virtual machine includes:
    calculating one or more seeds from the deployment metadata; and
    generating the key from the one or more seeds.

14. The non-transitory memory of claim 13, wherein the one or more seeds includes a first seed calculated from the deployment metadata of the virtual machine and a second seed from a cloud provider.

15. The non-transitory memory of claim 12, wherein loading the encrypted secrets to the deployed virtual machine in the cloud includes:
    storing the encrypted secrets in non-transitory memory of the cloud.

16. The non-transitory memory of claim 12, wherein deploying the virtual machine in the cloud using the deployment metadata includes:
    disabling one or more remote access connections to the virtual machine; and
    removing keys enabling the one or more remote access connections.

17. The non-transitory memory of claim 12, wherein:
    the secrets are uploaded from a local repository as locally encrypted secrets to a repository for deployment to the cloud; and
    wherein the one or more programs further cause the one or more servers to generate the locally encrypted secrets using a local key stored on-premise.

18. The non-transitory memory of claim 17, wherein the one or more programs further cause the one or more servers to:
    obtain the locally encrypted secrets from the repository for deployment to the cloud; and
    decrypt the locally encrypted secrets using the local key to derive the secrets.

19. The non-transitory memory of claim 12, wherein the one or more programs further cause the one or more servers to:
    calculate the key from the deployment metadata after booting the virtual machine in the cloud; and
    decrypt the encrypted secrets to generate unencrypted secrets without storing the unencrypted secrets in non-transitory memory of the cloud.

20. A device comprising:
    one or more processors;
    a non-transitory memory;
    a network interface; and
    one or more programs, stored in the non-transitory memory, which, when executed by the one or more processors, cause the device to:
    derive a key from deployment metadata of a virtual machine, wherein the deployment metadata change with each deployment of the virtual machine;
    encrypt secrets using the key to bind the key to the virtual machine; and
    deploy the virtual machine in a cloud using the deployment metadata, including loading the encrypted secrets to the deployed virtual machine in the cloud.

* * * * *